(12) United States Patent
Bizard

(10) Patent No.: US 8,381,637 B2
(45) Date of Patent: Feb. 26, 2013

(54) HOUSEHOLD ELECTRIC APPLIANCE LID HAVING A FILTRATION SUBASSEMBLY

(75) Inventor: Jean-Claude Bizard, Fontaine les Dijon (FR)

(73) Assignee: SEB S.A., Ecully (FR)

( * ) Notice: Subject to any disclaimer, the term of this patent is extended or adjusted under 35 U.S.C. 154(b) by 854 days.

(21) Appl. No.: 12/508,749

(22) Filed: Jul. 24, 2009

(65) Prior Publication Data

US 2010/0018411 A1   Jan. 28, 2010

(30) Foreign Application Priority Data

Jul. 25, 2008  (FR) ..................................... 08 04238

(51) Int. Cl.
*A47J 37/06* (2006.01)
(52) U.S. Cl. ........................................................ 99/341
(58) Field of Classification Search ................ 126/89.1, 126/206.17; 219/401; 99/324, 341, 403, 99/411, 426, 457, 473
See application file for complete search history.

(56) References Cited

U.S. PATENT DOCUMENTS

| | | | | |
|---|---|---|---|---|
| 4,148,250 A | * | 4/1979 | Miki et al. ....................... | 99/403 |
| 4,636,618 A | * | 1/1987 | Jenicot ........................... | 219/441 |
| 4,995,312 A | * | 2/1991 | Leiros ............................. | 99/411 |
| 5,029,519 A | * | 7/1991 | Boyen ............................. | 99/341 |
| 6,283,015 B1 | * | 9/2001 | Kwon et al. ..................... | 99/337 |
| 7,703,385 B2 | * | 4/2010 | Seurat Guiochet et al. ..... | 99/337 |
| 2002/0152897 A1 | | 10/2002 | Bouly et al. | |
| 2004/0007136 A1 | * | 1/2004 | Payen et al. ..................... | 99/330 |
| 2005/0034609 A1 | * | 2/2005 | Stephanou ...................... | 99/340 |
| 2009/0120303 A1 | * | 5/2009 | Popeil et al. .................... | 99/403 |
| 2010/0018411 A1 | * | 1/2010 | Bizard ............................. | 99/341 |
| 2011/0081471 A1 | * | 4/2011 | McLemore et al. ............ | 426/523 |

FOREIGN PATENT DOCUMENTS

| | | |
|---|---|---|
| EP | 0343141 A1 | 11/1989 |
| EP | 1426001 A1 | 6/2004 |
| WO | 03064007 A1 | 8/2003 |

* cited by examiner

*Primary Examiner* — Gene Kim
*Assistant Examiner* — M Chambers
(74) *Attorney, Agent, or Firm* — Browdy and Neimark, P.L.L.C.

(57) ABSTRACT

A lid for a household electric cooking appliance, the lid having: a lower face; an upper face; a flue extending between the upper face and the lower face for evacuating cooking fumes and having an entry and an exit; a seal carried by the lower face and surrounding the entry of the flue, the seal having a periphery; and a removable filtration subassembly extending across the flue, wherein the filtration subassembly is mounted in an opening of the lower face outside the periphery of the seal. A household electric appliance composed of: the lid described above, and a tank having an upper edge, wherein the seal of the lid is provided to cooperate with the upper edge of the tank.

16 Claims, 4 Drawing Sheets

HOUSEHOLD ELECTRIC APPLIANCE LID HAVING A FILTRATION SUBASSEMBLY

BACKGROUND OF THE INVENTION

The present invention relates to the field of household electric cooking appliances having a cooking enclosure comprising a tank, or pot, and a lid.

The present invention relates to more particularly the lids of such appliances, having a filtration subassembly for cooking fumes, or fumes, from the tank and a seal.

The patent document WO 03/064007 discloses a lid for a household electric cooking appliance having an evacuation conduit, or channel, or flue, for the cooking fumes, the channel connecting a lower face to an upper face, and a removable filtration subassembly extending across the channel, in which the lower face carries a seal surrounding an entry of the channel. However, in the disclosed appliance, the filtration subassembly is arranged at the entry of the channel. This provision presents the disadvantage of exposing the gripping means for the filtration subassembly to the cooking fumes. The user wanting to withdraw the filtration subassembly after cooking has been completed is likely to be obstructed by the presence of deposits on the gripping means. In the case of fryers, these deposits are fatty, which causes handling of the gripping means to be difficult.

BRIEF SUMMARY OF THE INVENTION

The present invention provides improved ergonomics for a lid of a household electric cooking appliance of the above mentioned type.

The present invention also improves the effectiveness of filtration of a lid of household electric cooking appliance of the above mentioned type.

The present invention further improves the ergonomics of a household electric cooking appliance of the above mentioned type.

The present invention also improves the effectiveness of filtration of a household electric cooking appliance of the above mentioned type.

More specifically, the present invention comprises a lid of a household electric cooking appliance comprising a channel, or flue, for evacuating the cooking fumes, the channel connecting a lower face to an upper face, the lower face carrying a seal surrounding an entry of the flue, and a removable filtration subassembly extending across the flue, wherein the filtration subassembly is mounted in an opening of the lower face at the outer periphery of the seal. This arrangement makes it possible to position the zone of gripping of the filtration subassembly at a distance from the cooking fumes. This arrangement also makes it possible to obtain an outer face of the lid that is free of removable elements, thus facilitating cleaning of the aforesaid outer face.

Advantageously, the flue emerges at a side wall of the lower face. This makes it possible to reduce the height of the lid.

Advantageously still, the lower face of the lid presents an inclined lower wall rising towards the side wall. This makes it possible to facilitate evacuation of the cooking fumes.

Advantageously still, for improved comfort of use, the lid has a viewing window.

Advantageously then, the tilted lower wall is formed by the viewing window. This provision contributes to reduce the deposits resulting from the cooking fumes on the viewing window.

Advantageously still, the filtration subassembly presents a curved form. This makes it possible to reduce the space taken up by the lid while making possible a large filtration surface facilitating the extraction and removal of the cooking fumes.

Advantageously then, the filtration subassembly presents a section curved towards a central part of the lid starting from the opening of the lower face. This makes it possible to further reduce the height of the lid, while retaining a good filtration effectiveness. This also makes it possible to facilitate withdrawal of the filtration subassembly when the lid is pivotally mounted.

Advantageously still, for greater safety of use, the lid presents an abutment designed to cooperate with a retaining element of the filtration subassembly.

Advantageously then, the retaining element is arranged on a deformable part of the filtration subassembly. This makes it possible to simplify the construction of the lid by fabricating it without deformable parts.

Advantageously still, the filtration subassembly has a filter arranged in a filter holder. This makes it possible to make renewal, or replacement, of the filter more economical.

Advantageously then, the retaining element is arranged on the filter holder. This makes it possible to simplify fabrication of the filter.

For these and other purposes, the present invention provides a household electric cooking appliance, in particular an electric fryer, comprising a tank, or pot, and a lid, in which the lid is provided with at least one of the preceding characteristics and in which the seal is designed to cooperate with an upper edge of the tank.

According to an advantageous form of construction, the tank is arranged in a case, or housing. This makes it possible to position the gripping zone for the filtration subassembly in inaccessible part of the lid when the lid is disposed on the tank.

According to a preferred form of construction, the lid is mounted pivotally on the case.

Advantageously then, the lid comprises two pivot components and the opening is arranged between the two pivot components. Thus, the filtration subassembly is assembled between the two pivot components. This makes it possible to reduce the obstruction of the lid while facilitating access to the filtration subassembly. Moreover, this provision contributes to improved observation of the cooking process through a tilted, or inclined, viewing window.

The invention will be better understood from the following disclosure of an exemplary embodiment of the invention, provided on a purely non-limiting basis and illustrated in the accompanying Figures.

DETAILED DESCRIPTION OF THE INVENTION

Figure 1:
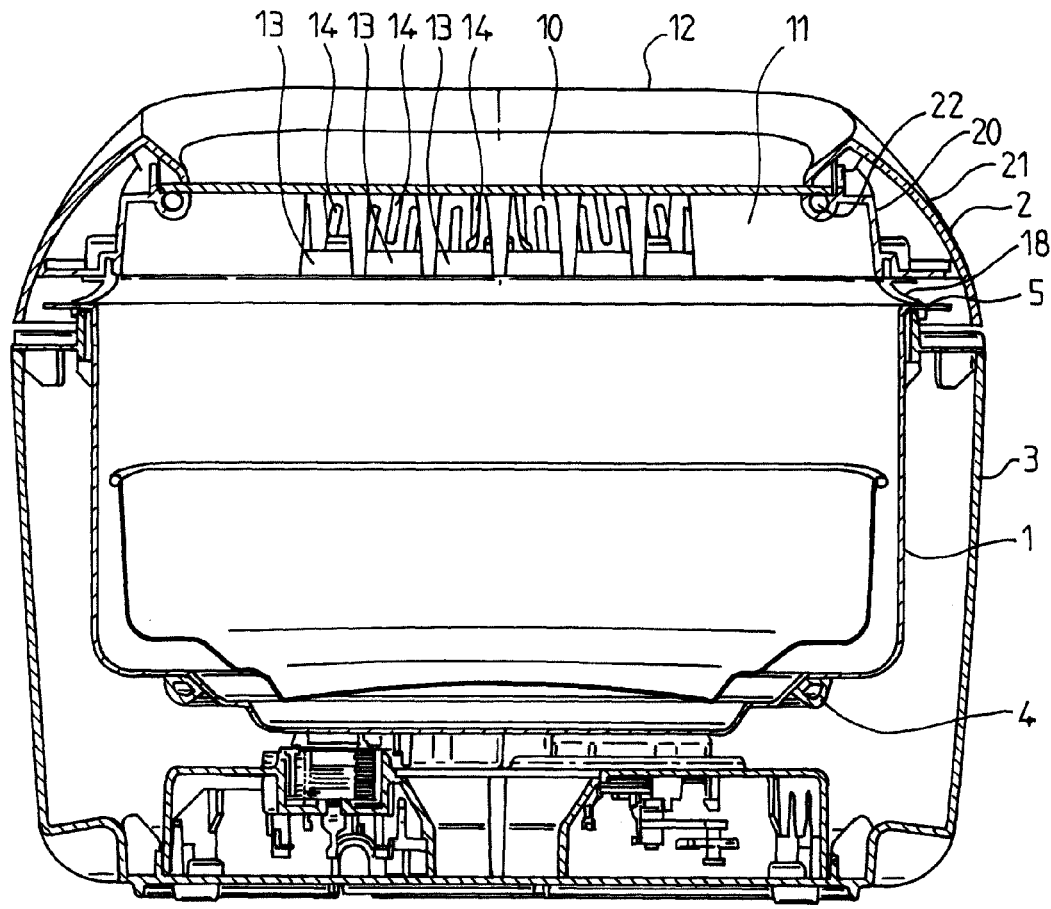
FIG. 1 is an elevational cross-sectional view, through a median plane, of a household electric cooking appliance comprising a lid according to the invention, but with the filtration subassembly withdrawn from the lid.

The household electric cooking appliance illustrated in FIG. 1 comprises a tank, or pot, 1 and a lid 2. Tank 1 is arranged in a case 3. Lid 2 is advantageously mounted to be removable from case 3. Tank 1 is associated with heating means 4. The household electric cooking appliance illustrated in FIG. 1 is for example an electric fryer.

Figure 2:
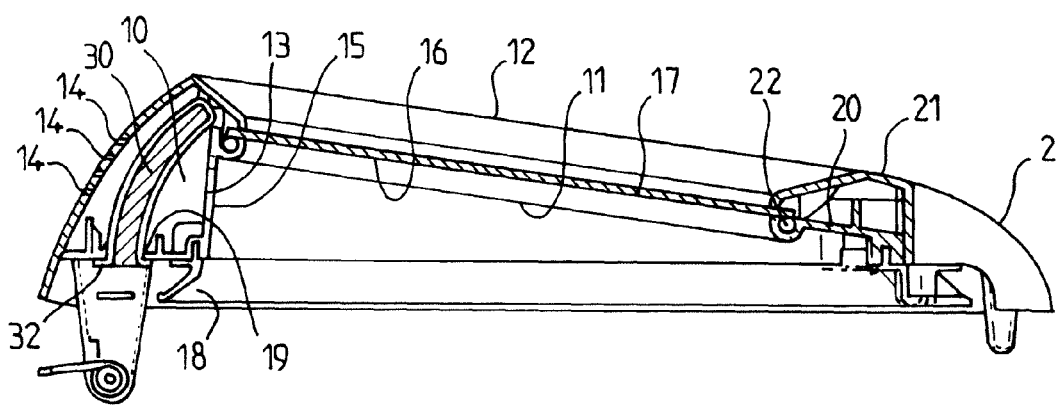
FIG. 2 is a an elevational cross-sectional view, through a median plane perpendicular to the plane of FIG. 1, of the lid illustrated in FIG. 1, with the filtration subassembly in place in the lid.

As shown in FIGS. 1 and 2, lid 2 has a lower, or inside, face 11 as well as an upper, or outside, face 12. Lower face 11 is designed to cover tank 1. Lid 2 also has a flue, or conduit, or channel, 10 for removal of cooking fumes, flue 10 extending between lower face 11 and outside face 12. For this purpose, lower face 11 has passages 13 and vents 14 in outside face 12. Passages 13 form an entry, or inlet, of flue 10 for removal of cooking fumes and vents 14 form an exit, or outlet, of flue 10. Lower face 11 of lid 2 is disposed to face tank 1 when lid 2 is closed.

According to an advantageous embodiment, flue 10 emerges in a side wall 15 of lower face 11 of lid 2. Lower face 11 of lid 2 has an inclined lower wall 16 rising toward side wall 15, and more specifically toward the upper end of wall 15. Lid 2 also has a viewing window 17. Viewing window 17 is advantageously made of glass and is mounted between a lower framework 20 and an upper cap 21. A tubular seal 22 is advantageously installed between lower framework 20 and viewing window 17. Inclined lower wall 16 is constituted by viewing window 17.

Figure 6:
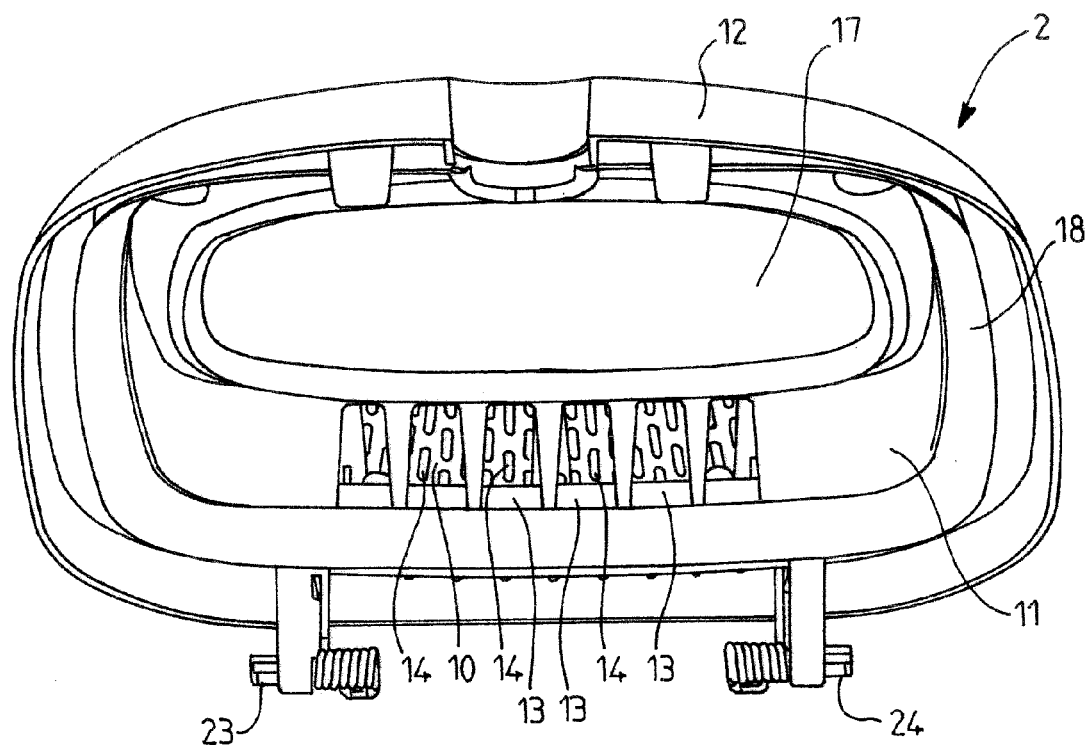
FIG. 6 is a perspective view showing the lid illustrated in FIGS. 1 and 2, viewed from below and showing the entry of the flue for evacuating cooking fumes, with the filtration subassembly removed.

Lower face 11 of lid 2 carries a seal 18 surrounding the entry of flue 10. Seal 18 is advantageously an annular lip seal. Seal 18 is provided to cooperate with an upper edge 5 of tank 1, as can be seen in FIG. 1. Passages 13 are surrounded by seal 18, as can be seen in FIG. 6.

Figure 8:
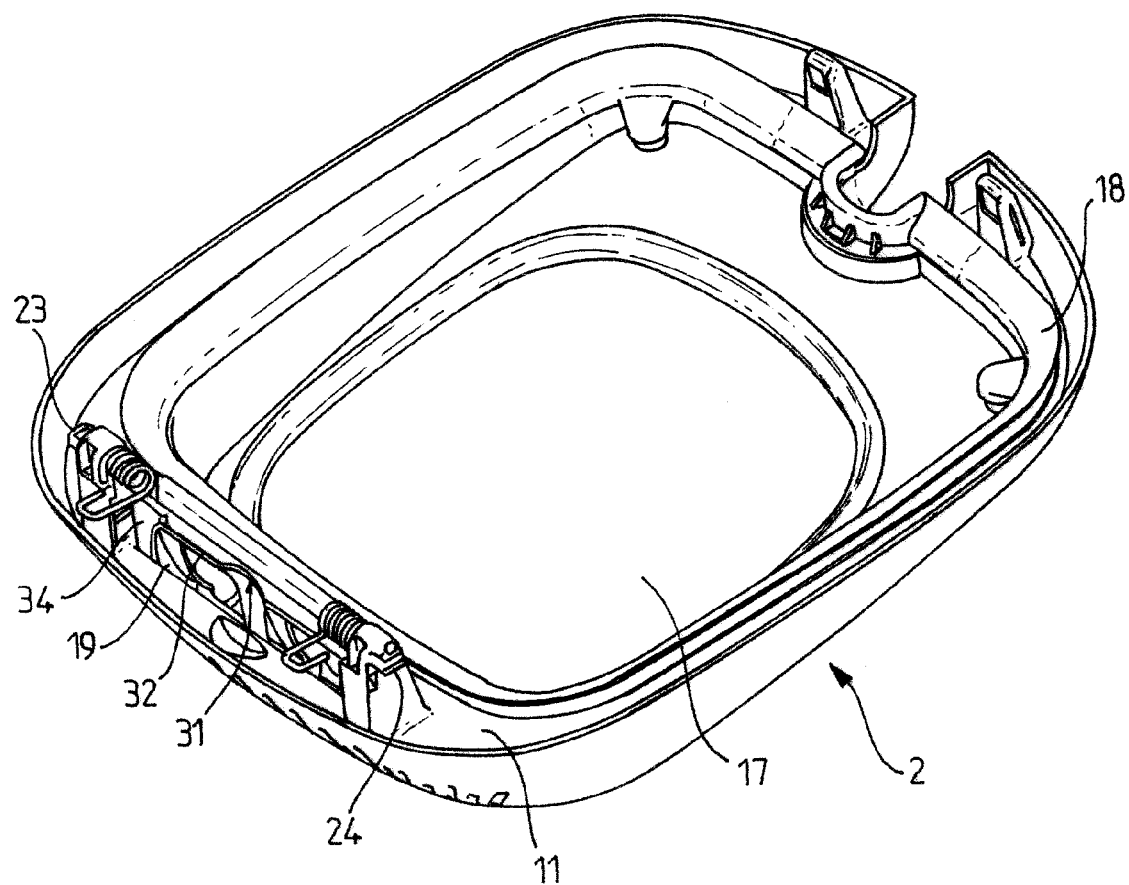
FIG. 8 is a perspective view showing the lid illustrated in FIGS. 1, 2 and 8, viewed from below and showing the assembly of the filter holder illustrated in FIG. 4.

Lid 2 comprises a removable filtration subassembly 30 extending across flue 10. Filtration subassembly 30 is installed in an opening 19 of lower face 11 outside the periphery of seal 18, as can be seen in FIGS. 2 and 8.

Figure 3:
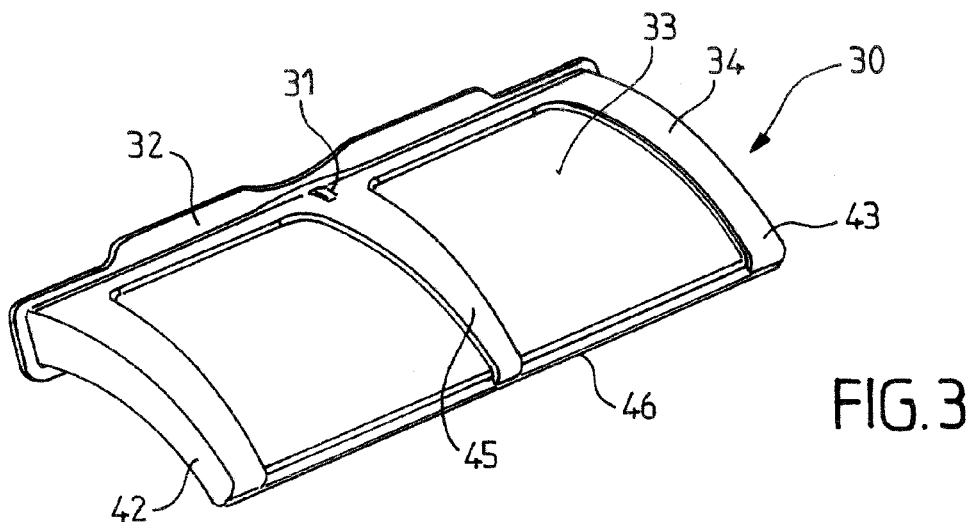
FIG. 3 is a perspective view of the filtration subassembly that is assembled in the lid illustrated in FIG. 2.
Figure 4:
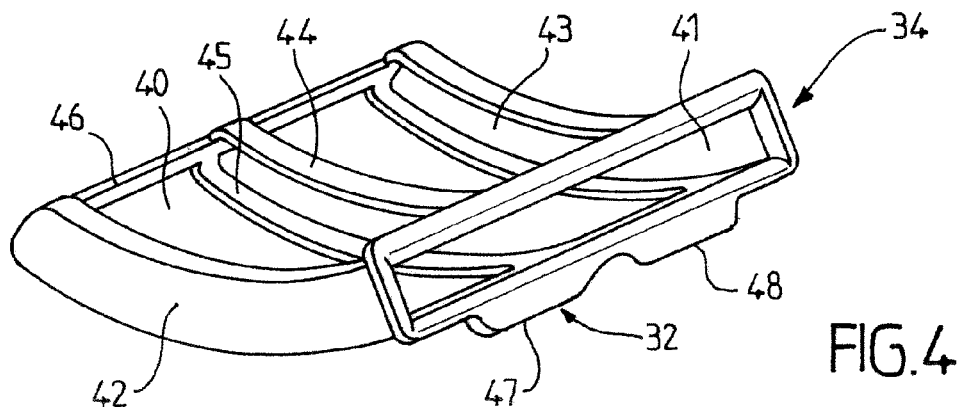
FIG. 4 is a perspective view of a filter holder for the filtration subassembly illustrated in FIG. 3.

More particularly, filtration subassembly 30 has a curved form, as seen in FIGS. 2-4. As shown in FIG. 2, filtration subassembly 30 has a cross section that is curved towards a central part of lid 2 starting from opening 19 of lower face 11. Lid 2 has an abutment member 25 (FIG. 7) provided to cooperate with a retaining element 31 of filtration subassembly 30. Retaining element 31 is advantageously arranged on a deformable, or at least slightly flexible, part of filtration subassembly 30. Filtration subassembly 30 has a gripping, or grasping, body 32 provided to facilitate the extraction of filtration subassembly 30 from lid 2.

In an advantageous way, filtration subassembly 30 includes a filter 33 arranged in a filter holder 34 and retaining element 31 is formed as a protuberance on filter holder 34. Grasping body 32 is also formed as a part of filter holder 34.

Figure 7:
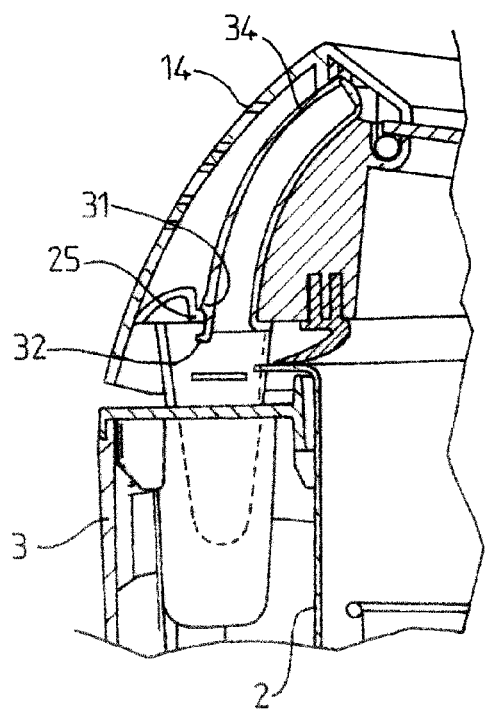
FIG. 7 is an elevational, cross-sectional detail view showing the pivot side of the lid on a case of the household electric cooking appliance illustrated in FIG. 1.

Filter holder 34, shown particularly in FIGS. 2-4, 7 and 8, defines, as shown in FIG. 4, a housing 40 provided to receive filter 33. For this purpose, filter holder 34 presents a mouth, or opening, 41 provided for the introduction of filter 33 into housing 40. Filter holder 34 has two side pieces 42, 43 each having a U-shaped cross section and provided to receive two opposed side edges of filter 33. Filter holder 34 also has two central pieces 44, 45 disposed along opposite sides of housing 40. Central pieces 44, 45 extend from mouth 41, are joined at their ends remote from mouth 41 and are connected to side pieces 42, 43 by a cross-piece 46. Filter holder 34 is made, for example, of PBT. Retaining element 31 is provided on filter holder 34, as best seen in FIGS. 3 and 7. Grasping body 32 is formed by two strips 47, 48 disposed at the exterior of mouth 41.

Figure 5:
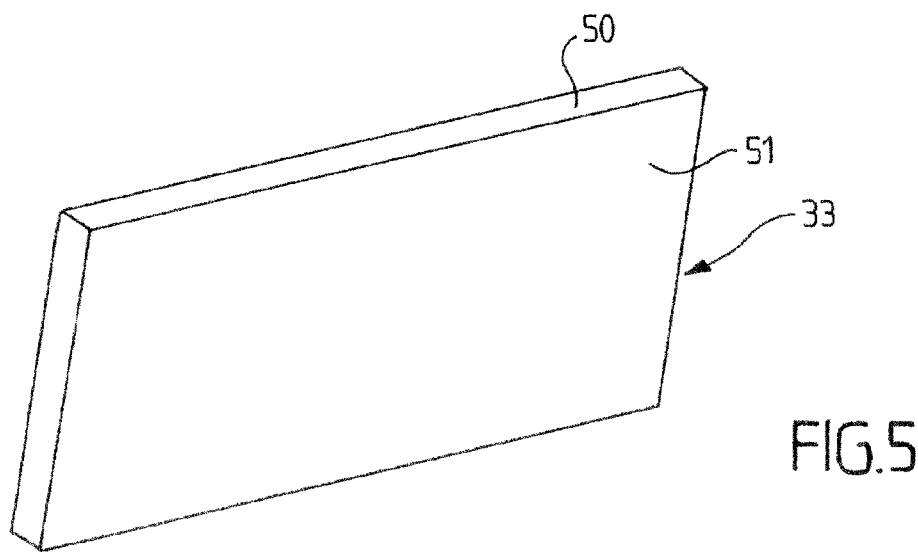
FIG. 5 is a perspective view of a filter element for the filtration subassembly illustrated in FIG. 3, intended to be installed in the filter holder illustrated in FIG. 4.

Filter 33, illustrated in FIG. 5, advantageously presents an upstream grease resistant, or grease absorbent, layer 50, made, for example, of nonwoven polyester, and a downstream odor absorbing layer 51 incorporating activated carbon. The thickness of upstream layer 50 can be greater than the thickness of downstream layer 51. Filter 33 is flexible and can be inserted without difficulties into housing 40 of filter holder 34 via mouth 41. Filter 33 will then be retained in place by pieces 42-45.

According to the preferred embodiment illustrated in the accompanying Figures, lid 2 is pivotally mounted on case 3. For this purpose, lid 2 comprises two pivot bodies 23, 24, shown most clearly in FIGS. 6 and 8. The two pivot bodies 23, 24 are located outside the periphery of seal 18. As shown in FIG. 8, opening 19 is arranged between the two pivot bodies 23, 24. Thus filtration subassembly 30 is assembled between the two pivot bodies 23, 24.

The present invention functions and is used in the following way. The user assembles filtration subassembly 30 by inserting filter 33 into housing 40 of filter holder 34, through mouth 41, with downstream layer 51 positioned on the side of filter holder 34 that carries grasping body 32. The user then installs assembled filtration subassembly 30 through opening 19 of lower face 11 of lid 2. The curved shape of filtration subassembly 30 allows the installation of the filtration subassembly 30 when lid 2 is raised with respect to case 3. The arrangement of filtration subassembly 30 outside the periphery of seal 18 makes it possible to prevent cooking fumes from tank 1 from coming in contact with grasping body 32.

Lid 2 according to the invention can be used with any household electric cooking appliance having a tank and a lid, such as for example a fryer, a rice cooker, or even a multi-function cooker.

Lid 2 may be installed on case 3 by inserting pivot bodies 23, 24 into cavities provided at the top of case 3. Such installation can be provided in the manner disclosed in the patent documents EP1426001 or U.S. Pat. Pub. 2002/152897, the disclosures of which are incorporated herein by reference.

As an alternative, filtration subassembly 30 is not necessarily arranged between pivot bodies 23, 24.

As a further alternative, filtration subassembly 30 is not necessarily arranged at the same side of the lid as pivot bodies 23, 24.

As another alternative, lid 2 is not necessarily pivotally mounted.

The present invention is by no means limited to the example of realization described and its alternatives, but includes many modifications within the framework of the claims.

This application relates to subject matter disclosed in French Application number 08 04238, filed on Jul. 25, 2008, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A lid for a household electric cooking appliance, said lid comprising:
    a lower face;
    an upper face;
    a flue extending between said upper face and said lower face for evacuating cooking fumes and having an entry and an exit;
    a seal carried by said lower face and surrounding said entry of said flue, said seal having a periphery; and
    a removable filtration subassembly extending across said flue, said filtration subassembly being constructed to oppose passage of at least one of grease and odors out of the appliance,
wherein said filtration subassembly is mounted in an opening of said lower face outside the periphery of said seal.

2. The lid according to claim 1, wherein said entry of said flue is located at a side wall of said lower face.

3. The lid according to claim 2, wherein said exit of said flue is located at a side wall of said upper face.

4. The lid according to claim 1, wherein said filtration subassembly has a curved form.

5. The lid according to claim 4, wherein said filtration subassembly has a cross section that is curved toward a central part of said lid, starting from the opening of said lower face.

6. The lid according to claim 1, wherein said lower face of said lid comprises an inclined lower wall rising toward said side wall.

7. The lid according to claim 6, wherein said inclined lower wall is constituted by a viewing window.

8. The lid according to claim 1, wherein:
    said lid further comprises an abutment; said filtration subassembly comprises a retaining element; and said abutment is provided to cooperate with said retaining element.

9. The lid according to claim 8, wherein said retaining element is arranged on a deformable part of said filtration subassembly.

10. The lid according to claim 1, wherein said filtration subassembly comprises a filter and a filter holder holding said filter.

11. The lid according to claim 10, wherein: said lid further comprises an abutment; said filtration subassembly comprises a retaining element, a filter and a filter holder holding said filter; said abutment is provided to cooperate with said retaining element; said retaining element is arranged on a deformable part of said filtration subassembly; and said retaining element is provided on said filter holder.

12. The lid according to claim 1, wherein said lid further comprises a viewing window.

13. A household electric appliance comprising: a tank having an upper edge; and a lid according to claim 1, wherein said seal is provided to cooperate with said upper edge of said tank.

14. The household electric appliance according to claim 13, further comprising a case in which said tank is housed.

15. The household electric appliance according to claim 14, wherein said lid pivotally mounted on said case.

16. The household electric appliance according to claim 13, wherein said appliance is an electric fryer.

* * * * *